United States Patent
Prilepov et al.

(10) Patent No.: US 11,611,477 B1
(45) Date of Patent: Mar. 21, 2023

(54) WIRELESS DATA LINK BETWEEN AN AUTONOMOUS VEHICLE AND OTHER VEHICLES

(71) Applicant: EMBARK TRUCKS, INC., San Francisco, CA (US)

(72) Inventors: Igor Prilepov, San Francisco, CA (US); Kwabena Agyeman, San Francisco, CA (US)

(73) Assignee: EMBARK TRUCKS INC., San Francisco, CA (US)

( * ) Notice: Subject to any disclaimer, the term of this patent is extended or adjusted under 35 U.S.C. 154(b) by 0 days.

(21) Appl. No.: 17/714,466

(22) Filed: Apr. 6, 2022

(51) Int. Cl.
*H04L 41/0823* (2022.01)
*H04W 4/46* (2018.01)
*H04L 67/00* (2022.01)

(52) U.S. Cl.
CPC .......... *H04L 41/0823* (2013.01); *H04L 67/34* (2013.01); *H04W 4/46* (2018.02)

(58) Field of Classification Search
USPC ........................................................ 709/217
See application file for complete search history.

(56) References Cited

U.S. PATENT DOCUMENTS

| | | | | |
|---|---|---|---|---|
| 2004/0204205 A1* | 10/2004 | Goodjohn | ................ | H04B 1/08 455/418 |
| 2004/0242197 A1* | 12/2004 | Fontaine | ............... | H04W 8/183 455/411 |
| 2005/0136909 A1* | 6/2005 | Eguchi | ................... | H04W 8/02 455/418 |
| 2008/0045169 A1* | 2/2008 | Zetzl | .................... | H04B 1/3822 340/4.3 |
| 2009/0286484 A1* | 11/2009 | Phung | .................. | H04W 24/04 455/67.11 |
| 2010/0112968 A1* | 5/2010 | Mackey | ............ | H04M 1/72448 455/186.1 |
| 2010/0235827 A1* | 9/2010 | Rinne-Rahkola | ......... | G06F 8/60 717/174 |
| 2010/0279640 A1* | 11/2010 | Bryan | .................. | H04B 1/0003 455/230 |
| 2012/0044856 A1* | 2/2012 | Huang | ................ | H04L 41/0809 370/315 |

(Continued)

FOREIGN PATENT DOCUMENTS

JP 2015119313 A * 6/2015

OTHER PUBLICATIONS

"Buy Two Way Radios" dated May 2, 2012, and retrieved from https://www.buytwowayradios.com/blog/2012/05/how_to_clone_a_motorola_RDX_Two_WAY_RADIO.html, on Oct. 20, 2022 (Year: 2012).*

(Continued)

*Primary Examiner* — Jamaal Henson
(74) *Attorney, Agent, or Firm* — Buckley, Maschoff & Talwalkar LLC

(57) ABSTRACT

A system and method including storing a configuration file defining one or more data structures to configure a first radio to communicate with a second radio, the configuration file defining at least a radio frequency (RF) channel and a plurality of data ports; and updating a set of configuration settings of the first radio based on the data structures defined in the configuration file, and to communicate RF data through the plurality of data ports with the second radio.

17 Claims, 11 Drawing Sheets

(56) References Cited

U.S. PATENT DOCUMENTS

2012/0252429 A1* 10/2012 Yoshizawa ............ H04W 24/02
455/418
2015/0095493 A1* 4/2015 Xu ........................ G06F 21/445
709/225

OTHER PUBLICATIONS

"Buy Two Way Radios" dated May 2, 2012, and retrieved from https://www.buytwowayradios.com/blog/2012/05/how_to_clone_a_morotola_RDX_two_WAY_RADIO.html, on Oct. 20, 2022 (Year: 2012).*

* cited by examiner

600

| ITEM | COMMENTS |
|---|---|
| RF Channel Configuration | • Channel Number<br>• Baud Rate<br>• PSID<br>• Source/Destination Address |
| Statistics Update Port Number | UDP Port Host Listens to For Statistics |
| Statistics Update Rate | Update Rate (milliseconds) |
| List of Data Ports | List of Data Channels for RF Communication, the following is provided for each:<br>• UDP<br>• Collect Statistics (Boolean Flag)<br>• MTU for Specified Port |

605 → RF Channel Configuration
610 → Statistics Update Port Number
615 → Statistics Update Rate
620 → List of Data Ports

| Port Purpose | Port Number |
|---|---|
| Configuration Port | May be changed via a command or the Configuration File |
| Outgoing Data | Defined in Configuration File |
| Outgoing QoS | If Any, Defined in Configuration File |
| Incoming Data | Defined in Configuration File |

WIRELESS DATA LINK BETWEEN AN AUTONOMOUS VEHICLE AND OTHER VEHICLES

BACKGROUND

Autonomous vehicles (e.g., self-driving trucks) include sensors, devices, and systems that may function together to generate sensor data indicative of various parameter values related to the position, speed, operating characteristics of the vehicle, indications of the specific surroundings of the self-driving vehicle, and a state of the vehicle.

Conventionally, the vast amounts of raw or processed sensor data generated and recorded by an autonomous vehicle might, after the vehicle completes a run (i.e., one or more driving sessions, trips, etc.), be retrieved from the vehicle and analyzed by a central processing system to gain some understanding the vehicle's operation, state, or behavior over the entire run or specific portions thereof. While such an analysis of the data after the completion of the run might be helpful in some instances (e.g., recreating an on-road scenario to review whether the vehicle performed appropriately, reviewing the state of one or more vehicle systems at the time of a particular event (e.g., an accident, an emergency stop, a lane change, etc.) or at a specific time (e.g., inclement weather, etc.)), it is insufficient in some other instances. For example, there may be situations where the current state of the vehicle is desired in real-time for monitoring, remote control, and other purposes.

Conventional systems aimed at providing real-time monitoring of vehicles may rely on cellular networks. However, real-time monitoring via cellular networks is typically constrained by latency issues and limited coverage and/or reliability associated with cellular networks. Accordingly, the performance and reliability of such systems cannot be guaranteed.

As such, there exists a need for a system and method to provide efficient and reliable wireless communication of an autonomous vehicle's behavior to other vehicles in a vicinity of the autonomous vehicle, with low latency.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 6 is an illustrative tabular listing of some parameters included in an example configuration file; in accordance with an example embodiment;

FIG. 7 is an illustrative tabular listing of some example port definitions for a V2V radio; in accordance with an example embodiment;

Figure 1:
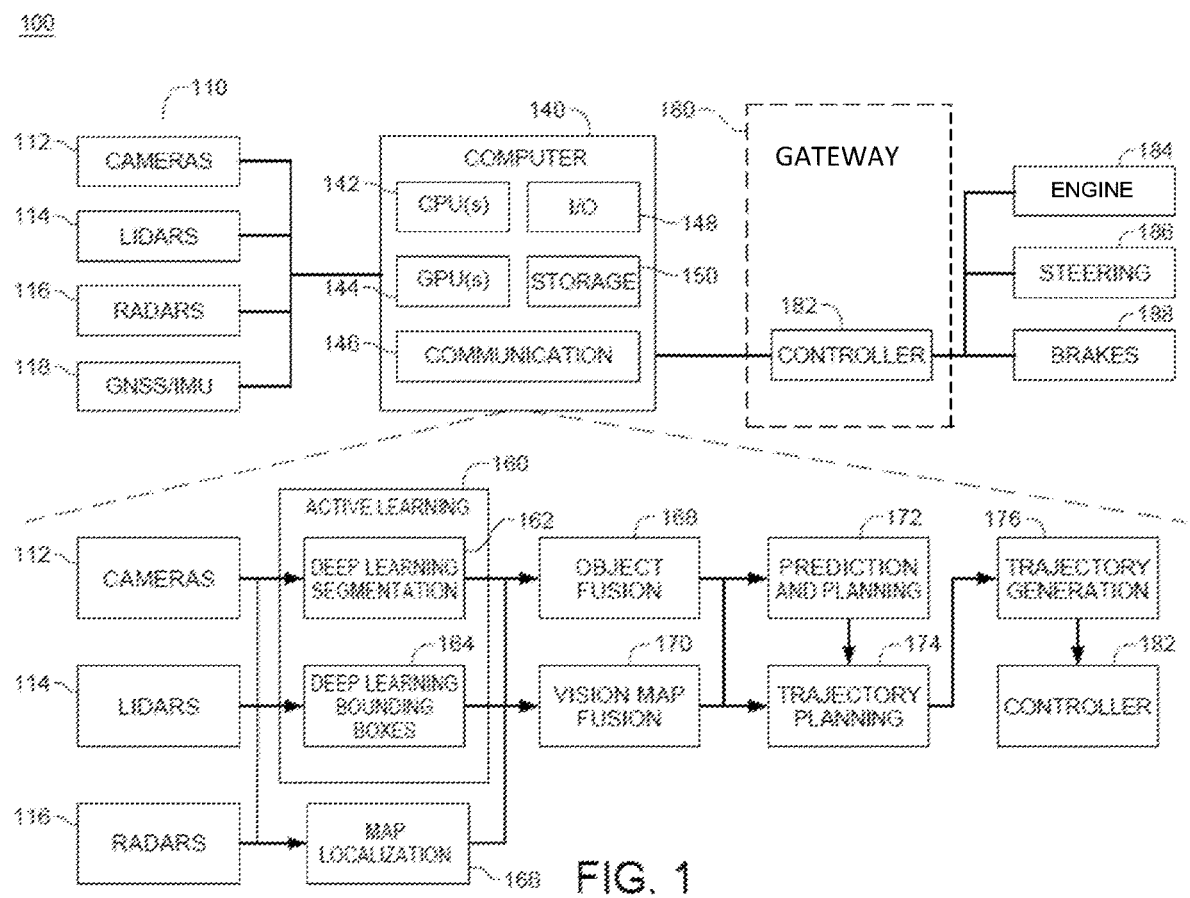
FIG. 1 is an illustrative block diagram of a control system that may be deployed in a vehicle, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the one or more principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures, methods, procedures, components, and circuits are not shown or described so as not to obscure the description with unnecessary detail. Thus, the present disclosure is not intended to be limited to the embodiments shown but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. However, it is understood that the scope of the invention is not limited to use within semi-trucks.

Figure 2A:
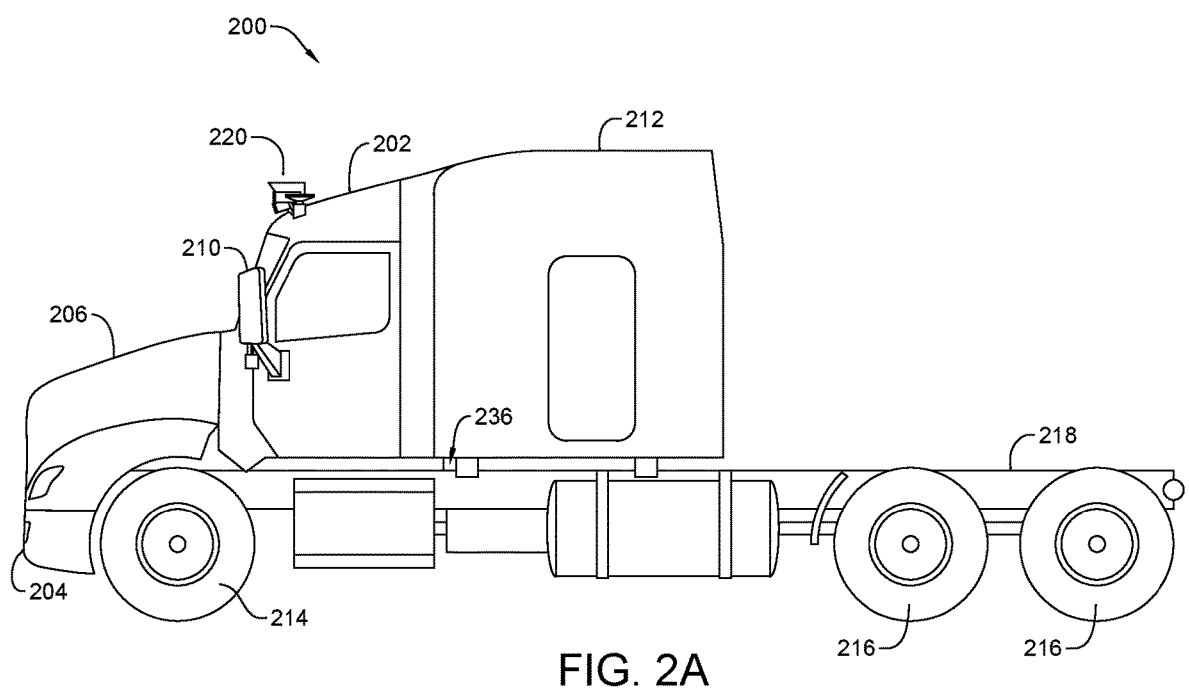
FIGS. 2A-2C are illustrative depictions of exterior views of a semi-truck, in accordance with example embodiments.
Figure 2B:
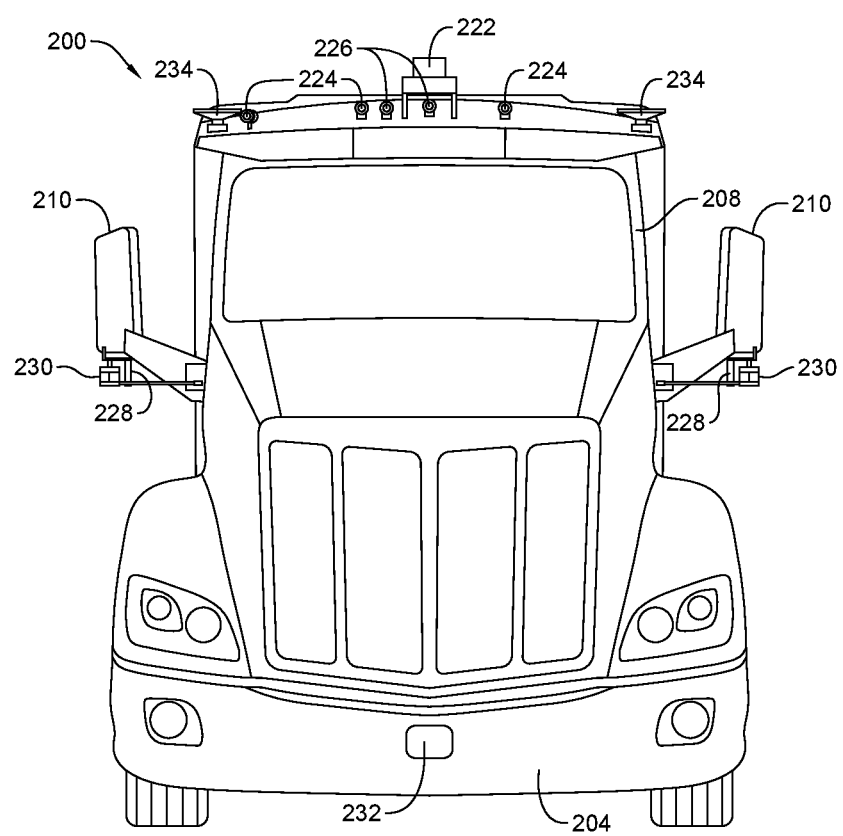
Figure 2C:
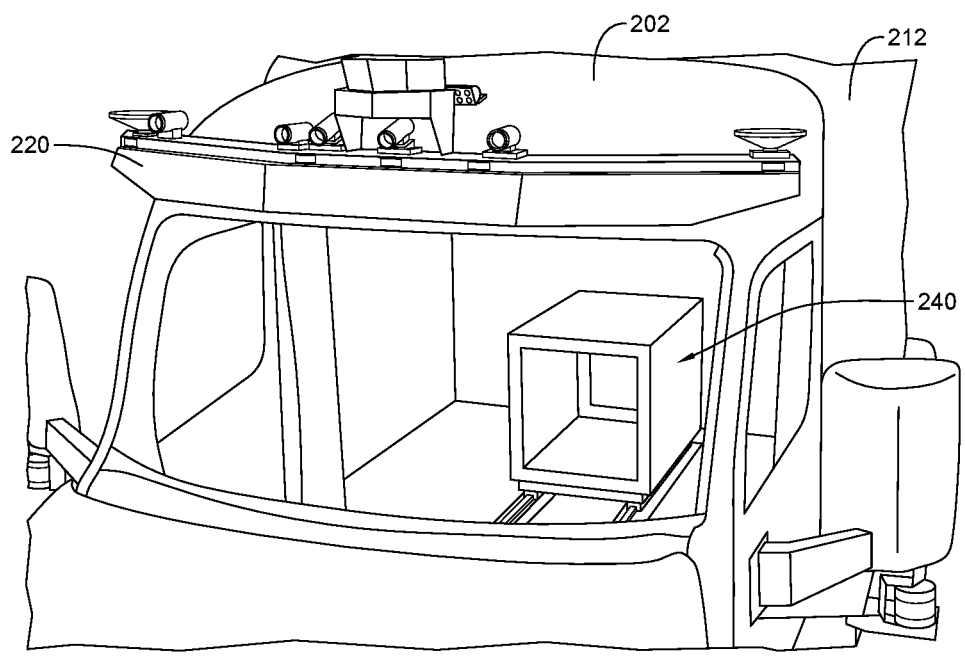

FIG. 1 illustrates a control system 100 that may be deployed in a vehicle such as, for example though not limited to, a semi-truck 200 depicted in FIGS. 2A-2C, in accordance with an example embodiment. Referring to FIG. 1, the control system 100 may include sensors 110 that collect data and information provided to a computer system 140 to perform operations including, for example, control operations that control components of the vehicle via a gateway 180. Pursuant to some embodiments, gateway 180 is configured to allow the computer system 140 to control vehicle components from different manufacturers.

Computer system 140 may be configured with one or more central processing units (CPUs) 142 to perform processing, including processing to implement features of embodiments of the present invention as described elsewhere herein, as well as to receive sensor data from sensors 110 for use in generating control signals to control one or more actuators or other controllers associated with systems of the vehicle in which control system 100 is deployed (e.g., actuators or controllers allowing control of engine 184, steering systems 186, brakes 188 and/or other devices and systems). In general, control system 100 may be configured to operate the vehicle (e.g., semi-truck 200) in an autonomous (or semi-autonomous) mode of operation.

For example, control system 100 may be operated to capture images from one or more cameras 112 mounted at various locations of semi-truck 200 and perform processing (e.g., image processing) on those captured images to identify objects proximate to or in a path of the semi-truck 200. In some aspects, one or more lidars 114 and radar 116 sensors may be positioned on the vehicle to sense or detect the presence and volume of objects proximate to or in the path of the semi-truck 200. Other sensors may also be positioned or mounted at various locations of the semi-truck 200 to capture other information such as position data. For example, the sensors might include one or more satellite positioning sensors and/or inertial navigation systems such as GNSS/IMU 118. A Global Navigation Satellite System (GNSS) is a space-based system of satellites that provides the location information (longitude, latitude, altitude) and time information in all weather conditions, anywhere on or near the Earth to devices called GNSS receivers. GPS is the world's most used GNSS system and may be used interchangeably with GNSS herein. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention.

The data collected by each of the sensors 110 may be processed by computer system 140 to generate control signals that might be used to control an operation of the semi-truck 200. For example, images and location information may be processed to identify or detect objects around or in the path of the semi-truck 200 and control signals may be transmitted to adjust engine 184, steering 186, and/or brakes 188 via controller(s) 182, as needed to safely operate the semi-truck 200 in an autonomous or semi-autonomous manner. Note that while illustrative example sensors, actuators, and other vehicle systems and devices are shown in FIG. 1, those skilled in the art, upon reading the present disclosure, will appreciate that other sensors, actuators, and systems may also be included in system 100 consistent with the present disclosure. For example, in some embodiments, actuators that provide a mechanism to allow control of a transmission of a vehicle (e.g., semi-truck 200) may also be provided.

Control system 100 may include a computer system 140 (e.g., a computer server) that is configured to provide a computing environment in which one or more software, firmware, and control applications (e.g., items 160-182) may be executed to perform at least some of the processing described herein. In some embodiments, computer system 140 includes components that are deployed on a vehicle (e.g., deployed in a systems rack 240 positioned within a sleeper compartment 212 of the semi-truck as shown in FIG. 2C). Computer system 140 may be in communication with other computer systems (not shown) that might be local to and/or remote from the semi-truck 200 (e.g., computer system 140 might communicate with one or more remote terrestrial or cloud-based computer system via a wireless communication network connection).

According to various embodiments described herein, computer system 140 may be implemented as a server. In some embodiments, computer system 140 may be configured using any number of computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

Different software applications or components might be executed by computer system 140 and control system 100. For example, as shown at active learning component 160, applications may be provided that perform active learning machine processing to process images captured by one or more cameras 112 and information obtained by lidars 114. For example, image data may be processed using deep learning segmentation models 162 to identify objects of interest in the captured images (e.g., other vehicles, construction signs, etc.). In some aspects herein, deep learning segmentation may be used to identify lane points within the lidar scan. As an example, the system may use an intensity-based voxel filter to identify lane points within the lidar scan. Lidar data may be processed by machine learning applications 164 to draw or identify bounding boxes on image data to identify objects of interest located by the lidar sensors.

Information output from the machine learning applications may be provided as inputs to object fusion 168 and vision map fusion 170 software components that may perform processing to predict the actions of other road users and to fuse local vehicle poses with global map geometry in real-time, enabling on-the-fly map corrections. The outputs from the machine learning applications may be supplemented with information from radars 116 and map localization 166 application data (as well as with positioning data). In some aspects, these applications allow control system 100 to be less map reliant and more capable of handling a constantly changing road environment. Further, by correcting any map errors on-the-fly, control system 100 may facilitate safer, more scalable and more efficient operations as compared to alternative map-centric approaches.

Information is provided to prediction and planning application 172 that provides input to trajectory planning 174 components allowing a trajectory to be generated by trajectory generation system 176 in real time based on interactions and predicted interactions between the semi-truck 200 and other relevant vehicles in the trucks operating environment. In some embodiments, for example, control system 100 generates a sixty second planning horizon, analyzing relevant actors and available trajectories. The plan that best fits multiple criteria (including safety, comfort and route preferences) may be selected and any relevant control inputs needed to implement the plan are provided to controller(s) 182 to control the movement of the semi-truck 200.

In some embodiments, these disclosed applications or components (as well as other components or flows described herein) may be implemented in hardware, in a computer program executed by a processor, in firmware, or in a combination of the above, unless otherwise specified. In some instances, a computer program may be embodied on a computer readable medium, such as a storage medium or storage device. For example, a computer program, code, or instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

A non-transitory storage medium may be coupled to a processor such that the processor may read information from, and write information to, the storage medium. In an alternative, the storage medium may be integral to the processor. The processor and the storage medium may reside in an application specific integrated circuit ("ASIC"). In an alternative embodiment, the processor and the storage medium may reside as discrete components. For example, FIG. 1 illustrates an example computer system 140 that may represent or be integrated in any of the components disclosed hereinbelow, etc. As such, FIG. 1 is not intended to suggest any limitation as to the scope of use or functionality of embodiments of a system and method disclosed herein. Computer system 140 is capable of being implemented and/or performing any of the functionality disclosed herein.

Computer system 140 may be described in the general context of computer system-executable instructions, such as program modules, being executed by a computer system. Generally, program modules may include routines, programs, objects, components, logic, data structures, and so on that perform particular tasks or implement particular abstract data types. Computer system 140 may be implemented in distributed cloud computing environments where tasks are performed by remote processing devices that are linked through a communications network. In a distributed cloud computing environment, program modules may be located in both local and remote computer system storage media including non-transitory memory storage devices.

Referring to FIG. 1, computer system 140 is shown in the form of a general-purpose computing device. The components of the computer system 140 may include, but are not limited to, one or more processors (e.g., CPUs 142 and GPUs 144), a communication interface 146, one or more input/output interfaces 148, and one or more storage devices 150. Although not shown, computer system 140 may also include a system bus that couples various system components, including system memory, to CPUs 142. In some embodiments, input/output (I/O) interfaces 148 may also include a network interface. For example, in some embodiments, some or all of the components of the control system 100 may be in communication via a controller area network ("CAN") bus or the like interconnecting the various components inside of the vehicle in which control system 100 is deployed and associated with.

In some embodiments, storage device 150 may include a variety of types and forms of non-transitory computer readable media. Such media may be any available media that is accessible by computer system/server, and it may include both volatile and non-volatile media, removable and non-removable media. System memory, in one embodiment, implements the processes represented by the flow diagram (s) of the other figures herein. The system memory can include computer system readable media in the form of volatile memory, such as random access memory (RAM) and/or cache memory. As another example, storage device 150 can read and write to a non-removable, non-volatile media (not shown and typically called a "hard drive" or a "solid-state drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules, code, and/or instructions that are configured to carry out the functions of various embodiments of the application.

FIGS. 2A-2C are illustrative depictions of exterior views of a semi-truck 200 that may be associated with or used in accordance with example embodiments. Semi-truck 200 is shown for illustrative purposes only. As such, those skilled in the art, upon reading the present disclosure, will appreciate that embodiments may be used in conjunction with a number of different types of vehicles and are not limited to a vehicle of the type illustrated in FIGS. 2A-2C. The example semi-truck 200 shown in FIGS. 2A-2C is one style of truck configuration that is common in North America that includes an engine 206 forward of a cab 202, a steering axle 214, and two drive axles 216. A trailer (not shown) may typically be attached to semi-truck 200 via a fifth-wheel trailer coupling that is provided on a frame 218 and positioned over drive axles 216. A sleeper compartment 212 may be positioned behind cab 202, as shown in 2A and 2C. FIGS. 2A-2C further illustrate a number of sensors that are positioned at different locations of semi-truck 200. For example, one or more sensors may be mounted on a roof of cab 202 on a sensor rack 220. Sensors may also be mounted on side mirrors 210, as well as other locations of the semi-truck. Sensors may be mounted on a bumper 204, as well as on the side of the cab 202 and other locations. For example, a rear facing radar 236 is shown as being mounted on a side of the cab 202 in FIG. 2A. Embodiments may be used with other configurations of trucks and other vehicles (e.g., such as semi-trucks having a cab over or cab forward configuration or the like). In general, and without limiting embodiments of the present disclosure, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors above windshield 208 including a long range lidar 222, long range cameras 224, GPS antennas 234, and mid-range front facing cameras 226. Side mirrors 210 may provide mounting locations for rear-facing cameras 228 and mid-range lidar 230. A front radar 232 may be mounted on bumper 204. Other sensors (including those shown and some not shown) may be mounted or installed on other locations of semi-truck 200. As such, the locations and mounts depicted in FIGS. 2A-2C are for illustrative purposes only.

Referring now to FIG. 2C, a partial view of semi-truck 200 is shown that depicts some aspects of an interior of cab 202 and the sleeper compartment 212. In some embodiments, portion(s) of control system 100 of FIG. 1 might be deployed in a systems rack 240 in the sleeper compartment 212, allowing easy access to components of the control system 100 for maintenance and operation.

Particular aspects of the present disclosure relate to a system and method of wireless communication between a subject autonomous vehicle (e.g., a truck similar to that disclosed in FIGS. 1 and 2A-2C) and other vehicles in a vicinity thereof. Wireless communication between the autonomous vehicle and other vehicles might be useful to, for example, monitor a performance of the autonomous vehicle (e.g., during an evaluation of the autonomous vehicle), remotely control features of the autonomous vehicle, etc., all while the autonomous vehicle is operating at normal driving speeds in all of the expected driving scenarios. Some embodiments of wireless communications systems and methods disclosed herein are designed to operate reliably (i.e., dependably and consistently), even when the autonomous vehicle might be travelling at highway speeds (e.g., in excess of about 65 miles/hr (about 105 kilometers/hr) or greater), including operating in areas lacking continuous or reliable cellular mobile network coverage. In some instances, even when cellular network (e.g., 4G/5G)

coverage might be adequate, the latency introduced by such cellular systems might be unacceptable for some desired communication purposes.

Figure 3:
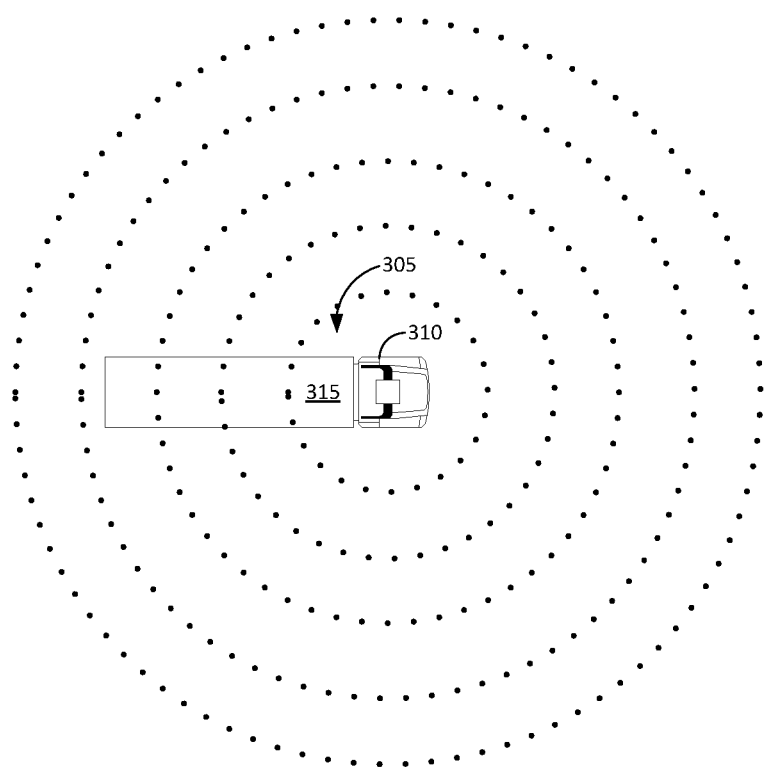
FIG. 3 is an illustrative depiction of a truck configured for V2V communication, in accordance with an example embodiment.

FIG. 3 is an illustrative depiction of an autonomous vehicle configured to facilitate, support, and provide wireless communication amongst itself and other appropriately configured vehicles within wireless range of each other, in accordance with an example embodiment. The autonomous vehicle 305 depicted in FIG. 3 including a cab 310 and a trailer 315 may be the same as or similar to the truck disclosed in FIGS. 1 and 2A-2C above. In some embodiments, computer 140 may be configured to implement any of the processes (or portions thereof) related to providing and supporting wireless communication between autonomous vehicle 305 and other vehicles disclosed herein.

In some embodiments, autonomous vehicle 305 may be configured to wirelessly broadcast data sensed or otherwise generated by the multiple different systems and subsystems (e.g., state data, etc.) located on-board the truck. In some instances, the shape of a wireless signal broadcast from autonomous vehicle 305 may be substantially omnidirectional as depicted in FIG. 3, where the radio generating the wireless signal is located in cab 310 and one or more omnidirectional antennas are located on a sensor rack or other support structure also on the cab. In some aspects, FIG. 3 provides an illustrative depiction of an example wireless radio frequency (RF) waves broadcast by autonomous vehicle 305. The actual RF radiation pattern shape and range may depend on the frequency of the signal, transmitter signal strength, antenna properties, atmospheric and other environmental conditions, and other factors, as known.

Figure 4:
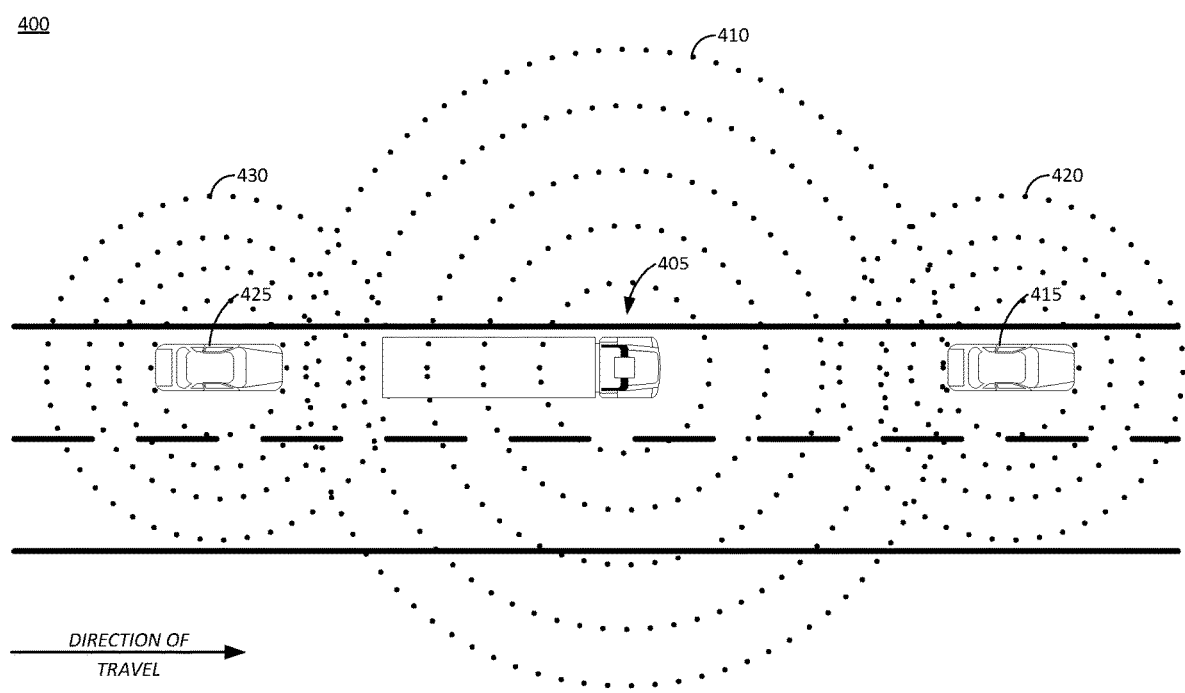
FIG. 4 is an illustrative depiction of a V2V communication scenario, in accordance with an example embodiment.

FIG. 4 is an illustrative depiction of an autonomous vehicle 405 and other vehicles 415 and 425 within wireless communication range of the autonomous vehicle. In accordance with some embodiments herein, the vehicles 415 and 425 are equipped or otherwise configured to wirelessly communicate with autonomous vehicle 405. In the example of scenario 400 of FIG. 4, vehicles 415 and 425 are positioned within wireless communication range of the autonomous vehicle 405, as illustrated by the overlapping radio waves 410, 420, and 430 transmitted by the radios located on the autonomous vehicle 405, vehicle 415, and vehicle 425. In some instances, with respect to scenario or operational environment 400, vehicle 415 may be referred to as a lead vehicle and vehicle 425 may be referred to as a follow vehicle based on the relative location of the vehicles and the direction of travel indicated in FIG. 4. In general, the designations of a vehicle herein as being either a lead vehicle or a follow vehicle implies no significance other than to distinguish between the vehicles, unless otherwise specified. In some instances, lead vehicles and follow vehicles may, in general, also be referred to herein as convoy vehicles.

As will be discussed in greater detail below, autonomous vehicle 405 may be configured to broadcast data related to its operation and state, as well as wireless communication data pertaining the configuration and operation of the wireless communications between itself and other appropriately configured vehicles (e.g., lead and follow vehicles 415 and 425, respectively). Further, convoy vehicles herein may be configured to receive the data wirelessly broadcast by an autonomous vehicle. In some embodiments, some convoy vehicles might be configured to wirelessly broadcast signals that may include messages, commands, and instructions to an autonomous vehicle for further use (e.g., use the received data or information to invoke an action, a control, or a system on the autonomous vehicle) or storage or retransmission by the autonomous vehicle, and other actions. In some instances, the messages, commands, and instructions wirelessly broadcast by the convoy vehicles might be in reply to data and other information received at the convoy vehicles from an autonomous vehicle.

In some aspects, one or more embodiments of the present disclosure might be implemented independent of a particular frequency range and protocols and standards associated with a physical communication channel used for wireless communication by an autonomous vehicle herein. For example, one embodiment of a wireless communication method and system implemented by an autonomous vehicle herein to communicate with other vehicles might use one or more of the physical communication channels (previously) allocated for dedicated short-range communication (DSRC) in the United States. Initially, 75 MHz of spectrum in the 5.9 GHz band was allocated for use by transportation system communications divided into seven channels, including one control channel and six service channels each dedicated to a different service. More recently, some of the spectrum previously allocated for DSRC has been reallocated for other uses (e.g., 30 MHz reallocated to C-V2X (cellular vehicle-to-everything) communications standard). As highlighted by the changing spectrum reserved for DSRC, communications standards are not necessarily static or guaranteed to be available in the future.

In some embodiments, the wireless vehicle-to-vehicle communications system and method embodiments herein are not dependent on a particular wireless communication standard or protocol and might be adapted to operate on top of one or more different communication standards and protocols, including different frequencies and physical channel(s) therein. In some aspects, some embodiments of the wireless vehicle-to-vehicle communications system and method herein might be configured to operate on different RF frequencies and communication protocols by varying the radios used to transmit and receive vehicle-to-vehicle data packets. Significantly, a wireless spectrum is available for the publication (i.e., broadcast) of vehicle-to-vehicle data on a frequency allocated (e.g., by an authorized governmental agency) for such use on public roads where trucks and other vehicles typically operate. In some instances, the radios used to wirelessly transmit and receive the data may be adapted for the specific, allocated wireless spectrum.

Both the DSRC and C-V2X (and other) communication standards specify a certain amount of bandwidth that is reserved for specific channels dedicated for the transfer of specific information (e.g., emergency braking, emergency vehicle ahead/behind warning systems, etc.). These and other communication standards also specify a "public" band of spectrum (e.g., one or more physical channels) that may be used for other general purpose communications between vehicles. Some embodiments herein provide mechanisms for a wireless vehicle-to-vehicle communication system and method that might publish or broadcast data and information related to an autonomous vehicle on "public" channel(s) of a DSRC, C-V2X, or other communication protocol systems.

Figure 5:
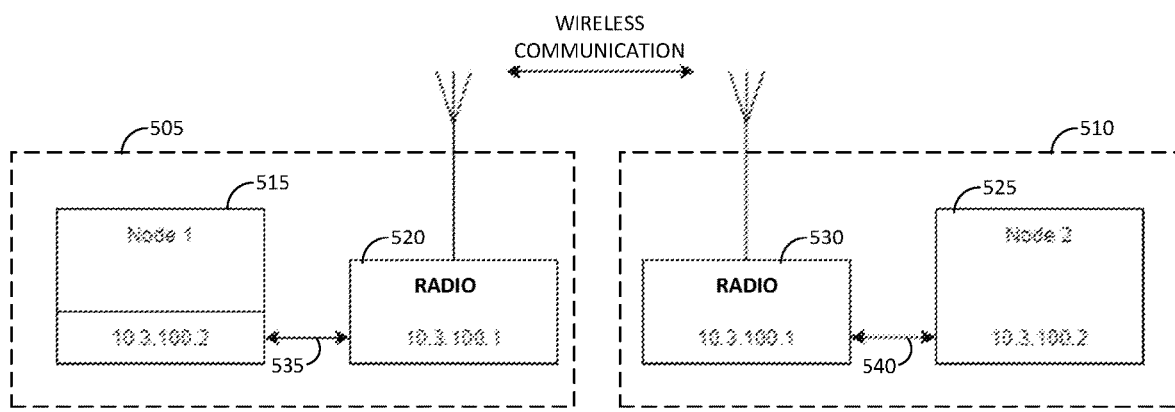
FIG. 5 is an illustrative depiction of a network topology for V2V communication, in accordance with an example embodiment.

FIG. 5 is an illustrative depiction of a network topology for vehicle-to-vehicle communication, in accordance with an example embodiment. Network 500 includes communication equipment located at an autonomous vehicle (e.g., a self-driving truck) 505 and another vehicle 510 (e.g., a convoy vehicle such as a lead vehicle or a follow vehicle). Each vehicle includes a node (e.g., a host computer) and a radio. Truck 505 in FIG. 5 includes node 515 and radio 520. In some embodiments, a radio herein might comprise one or more apparatuses, systems, subsystems, and associated modules and components to implement wireless communication, networking, and other functions disclosed in some aspects of the present disclosure. For example, in one embodiment a radio herein might comprise a memory and processor to support configuring the radio. In another embodiment, these (and other) elements might be included in a device or system separate from the radio (e.g., a control module that manages or controls one or more aspects of the radio's operation, such as for example, configuring or updating a configuration file of the radio). In some embodiments, truck 505 might be similar to truck 200 in FIGS. 2A-2C, where node 515 might be implemented by computer 140 or another computer(s) configured to perform the functions disclosed herein for vehicle-to-vehicle communications. Convoy vehicle 510 includes node 525 and radio 530. Node 525 might be a special-purpose computer dedicated to performing vehicle-to-vehicle communications-related tasks or a general purpose computer programmed or otherwise executing program instructions to effectuate vehicle-to-vehicle communications-related tasks, in accordance with such processes disclosed herein.

Radios 520 and 530 communicate wirelessly with each other over a wireless RF communication link. In one example embodiment, radios 520 and 530 might be configured to operate on a physical channel specified by the DSRC protocol. In one embodiment, radios 520 and 530 might be configured to implement a C-V2X protocol. As mentioned above, the vehicle-to-vehicle communication method and system herein is not reliant or otherwise dependent on the DSRC or other communications standard.

Communication between a node and a radio (e.g., node 515 and radio 520 on truck 505 or node 525 and radio 530 on convoy vehicle 510) may be implemented by a UDP (User Datagram Protocol) link therebetween. Network 500 includes UDP link 535 between node 515 and radio 520 on truck 505. Similarly, there is a UDP link 540 between node 525 and radio 530 at the convoy vehicle 510.

In some aspects, no distinction may be made between the nodes in network 500. All of the nodes in network 500 should be capable of sending and receiving UDP packets using the same IP (Internet Protocol) address. In the example of FIG. 5, the IP address used for all of the nodes is "10.3.100.2", though the actual address that may be used in a deployed system can be different than this example. Since the nodes are configured to have the same IP address, some embodiments herein can use different ports to send UDP packets and to receive UDP packets. For example, a first port of node 515 on truck 505 can be designated to broadcast sensors data from the truck and a second port of the truck's node 515 can be designated to listen for UDP packets from convoy vehicle 510 (e.g., a command to invoke an action on the truck). Conversely, convoy vehicle 510 will designate a port to listen for broadcasts from the truck and another, different port of node 525 will be designated for broadcasting UDP packets to truck 505.

Regarding the radios in network 500, they may have the same IP address (e.g., "10.3.100.1") but different ports will be used to handle various data types and configuration packets.

In some aspects, the wireless radios in some embodiments herein might be configured for a highest bandwidth and distance tradeoff or balance. For example, a design objective might be to use as little bandwidth as feasible to increase a distance and robustness of the wireless communication link. The radios should all use the same channel. In some instances, embodiments of the radios of network 500 might include two antennas, arranged in a redundancy configuration to allow communication in case one of the antennas is blocked.

In some aspects, all data, whether broadcast or unicast data sent to the radios should be processed the same. Broadcast data received by a radio should be sent to the IP address of its associated node (e.g., "10.3.0.2") as a unidirectional UDP packet. The source for the UDP packet should be changed to the radio's IP address (e.g., "10.3.100.1"). The source and destination ports for the broadcast traffic to unidirectional traffic should be unchanged. In this manner, the wireless communication link (DSRC, C-V2X, or otherwise) operates as a broadcast medium that any entity in network 500 (e.g., any vehicle equipped with a node and radio configured as disclosed herein) may enter and exit the network on an ad-hoc basis. Some embodiments herein accordingly provide no IP address level routing, whereas port routing is maintained.

In some embodiments, network 500 provides and supports wireless communication between the vehicles therein where a typical over-the-air time that it takes for a packet to be delivered from one host to another is about 5-6 milliseconds. While all data packets might not be delivered at the same rate, and because wireless communication may be unpredictable, some embodiments herein might consistently enable data packets to be delivered within about 10-20 milliseconds. This compares favorably to LTE communications that might typically have a latency of about within 300-500 milliseconds.

In some aspects, an application layer may be built on top of the transport layer discussed above. In some embodiments, data packets sent or received may be wrapped with a truck number and role. In some embodiments, the options for the role may include a truck, a lead vehicle, a follow vehicle, and a scout vehicle (e.g., a dedicated vehicle to collect the data about the road conditions ahead of the convoy and share it with others). Application logic on each vehicle, whether truck, lead vehicle, follow vehicle, or scout vehicle, can filter data packets based on the truck number indicated in the packet. In this manner, two or more trucks may simultaneously operate and broadcast data in a same location since other vehicles receiving the broadcast can filter (i.e., differentiate) data from each truck based on the truck number identifier included in each data packet. For example, if a lead vehicle is configured to listen for data from and send data to a self-driving, autonomous truck with a particular truck ID (e.g., "Truck 021"), then this vehicle may receive and process data including the truck ID of "Truck 021" while discarding data messages received from another truck (e.g., a truck with the truck ID of "Truck 002") also operating within communication range of this lead vehicle.

In some embodiments, a role identifier included with data packets may be used by application logic of a node to determine what vehicle entity is sending each data packet. In some instances, the role of the sender might influence how the received data is processed (e.g., save, disregard, etc.) or whether a particular action is invoked or stopped in response to the received data. For example, only a follow vehicle might be authorized to request the truck to slow down or to move to the shoulder.

In some embodiments, a radio of a wireless vehicle-to-vehicle communications system and method herein might be selectively configured using a configuration file that defines operational parameters for the radio, including but not limited, to data channel(s) used by the radio, the transmission power and speed on each channel, etc. A configuration for the radio may be stored in a file (i.e., data structure) that can be accessed and executed by the radio upon a power on event. In some embodiments, a radio herein might be configured to have a UDP port dedicated for receiving a configuration file from the host. A configuration file received via the radio's dedicated UDP configuration port may be deployed to the radio to replace a current configuration file. In some instances, a validity or authenticity of the configuration file might be verified before it replaces a current (i.e., already installed) configuration file.

FIG. 6 is an illustrative tabular listing of some parameters that might be included in an example configuration file; in accordance with an example embodiment. Table 600 includes a listing of items that may be included in one embodiment of a configuration file herein. Other configuration file embodiments might include more, fewer, or alternative items. In some instances, the type of items included in a configuration file might depend on the type of radio apparatus, system, subsystem, component(s) and associated module(s) and devices used and some of the features of the communication protocol implemented by the radio and the associated module(s) and devices. Table 600 also includes a brief description or comment regarding the listed items.

RF channel configuration 605 may include, in the instance of a DSRC radio, an indication or specification of the channel used by the radio, a baud rate, the PSID (Provider Service Identifier) to differentiate this wireless service from others, and a source/destination MAC (media access control) address assigned to a packet in the RF channel to aid the filtering of unwanted data. The statistics update port number 610 includes an indication of the designated UDP port the host listens to for statistics and the statistics update rate item 615 specifies that rate at which the statistics may be updated. The list of data ports at item 620 lists the data channels that will be used to transport the RF data. For each data port, parameters including the UDP port where a sender will send data and a receiver will listen for data, an indication whether statistics will be collected for this data port, and the MTU (maximum transmission unit) size for the port (e.g., if different than a default size) are specified.

In some embodiments, a configuration file for a wireless vehicle-to-vehicle communications system and method herein might be implemented using Protocol Buffers (i.e., protobuf, which is an open-source cross-platform data format used to serialize structure data and developed by Google™) Accordingly, one or more proto definition files (e.g., ".proto") may be generated that describe data structures (i.e., messages) and services to implement the configuration of a radio herein. In some instances, other data formats may be used to formally define data of a configuration file herein.

In some embodiments, a configuration definition file may specify the configuration of data ports (e.g., PortConfig), including single data port parameters; and configuration parameters (e.g., V2VConfig) regarding vehicle-to-vehicle parameters. The PortConfig may specify the port used to send data to and read data from; a quality of service (QoS) port, if defined, to report a QoS for each data packet published on the data port; an MTU for the data packet; a data format for the port. The configuration file may further include specifying the UDP packet will be sent wrapped in a data structure (i.e., a V2VHeader) that includes the sender's MAC address and the associated sent/received time. Other specified parameters might include indications sent from the radio itself including a V2V status; a current configuration status for the radio; and an update rate associated with the V2V status and configuration.

Regarding the configuration parameters (e.g., V2VConfig), the vehicle-to-vehicle parameters might include a specification of the available (DSRC) channels; transmission power; PSID; baud rate; the destination IP address for the UDP packets; and the UDP port designated for receiving a configuration file.

In some embodiments, a status protobuf may be used to define details about single data packets, as well as an overall "health" status for the vehicle-to-vehicle communication network. This protobuf can include the V2VHeader introduced above that is sent with the payload of the RF communication link. This data structure may specify parameters including the port the payload was received from; the UTC time the payload was to be sent; the time when the header received the payload; and the serialized UDP payload as it was received. Another data structure defined by this protobuf might specify parameters detailing QoS aspects for each packet. The parameters might include the MAC address of the sender radio; a received signal strength indicator (RSSI); the time the packet was sent; the time when the header was received; a channel load; and a channel number; the data rate; the transmit power used; the PSID; and a version of the node software. In some aspects, the specification of parameters for the QoS for each data packet in each hear might be used to, for example, to monitor the quality of service of the system in real-time, including degradations and other changes that might warrant a corrective or mitigating action. For example, an observed reduction in QoS based on the values included in the header of data packets herein might provide sufficient notice for a user to switch to another physical channel (if available) or at least become aware of a potential delay in packets or loss of communication.

In some embodiments, the configuration file may specify or otherwise define a version field that includes an indication of the software version running on the node sourcing the data packet. In some instances, the version parameter may have an integer value, where the same version value for different nodes indicates they are running the same version of software (i.e., their data formats, etc. are compatible). In some instances, some different versions numbers may be compatible with each other (e.g., versions 3.0-3.45 might be compatible with each other and have the same data formats), whereas other sets of dissimilar versions numbers are not compatible with each other (e.g., versions 3.4 and 3.5 might not be compatible). In some embodiments, a runtime check may be performed regarding the versioning.

In some embodiments, the status protobuf might specify parameters that represent a "snapshot" of the performance of the vehicle-to-vehicle communication system herein over a period of time. A data structure of this type (e.g., V2VStatus) might define parameters including a signal strength; a receiving data rate; a DSRC channel load; the number of packets received; the number of packets received by the radio and sent to its associated node (i.e., the filtered data); the transmit power; the DSRC channel used; and the time to deliver a packet over the air.

FIG. 7 is an illustrative tabular listing of some example port definitions for a vehicle-to-vehicle radio system and method, in accordance with an example embodiment. Table 700 includes a listing of ports that may be used by a (DSRC) radio in some embodiments herein. As shown, ports defined for the radio might include a configuration port 705, an outgoing data port 710, an outgoing QoS port 715, and an incoming data port 720. As noted in table 700, the QoS data port might not be specified since, in some embodiments, it may be an optional configurable feature.

In some aspects, a radio herein may boot or otherwise load a configuration file faster than, for example, a node or host computer on the network. For example, a radio herein might be ready to run a configuration file in a matter of seconds, whereas a node herein might be ready in about 1 minute.

In some embodiments, a process herein may provide a mechanism to update or otherwise change a configuration of the radios of a vehicle-to-vehicle radio system and method herein, without a need to manually change the hardware or software of the radio. In accordance with some embodiments, modifications to the configuration of a radio of a system herein might be modified without altering the hardware or software on the radio. While the configuration file processed in some instances herein by a radio to update or modify the radio's configuration may be changed, the hardware and software of the radio may remain unchanged throughout a radio configuration modification in some embodiments.

Figure 8:
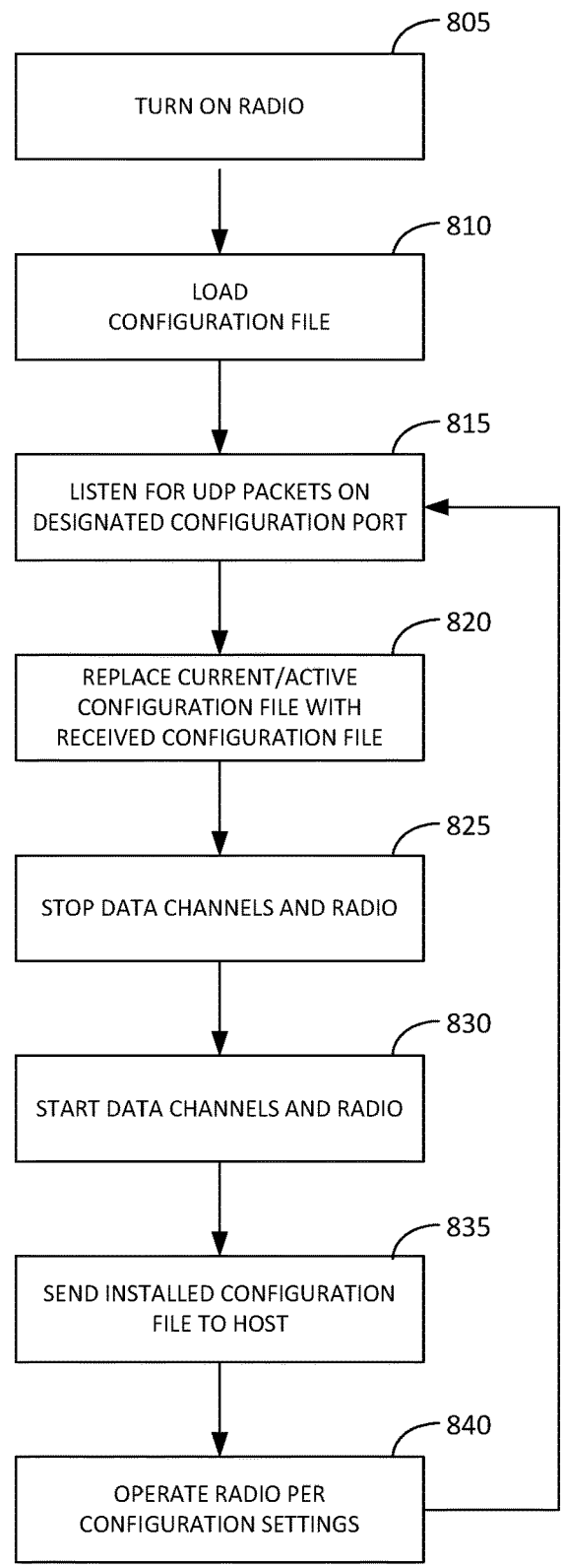
FIG. 8 is an illustrative flow diagram of an example configuration process, in accordance with an example embodiment.

FIG. 8 is an illustrative flow diagram of an example configuration processor for a vehicle-to-vehicle radio system and method, in accordance with an example embodiment. In some embodiments, a bridge application for a radio herein might implement process 800. At operation 805, the radio (e.g., radio 520 at self-driving truck 505 in FIG. 5) is powered on. The application might be initiated with a command line and proceed to generate a default configuration file. The default configuration file may include all of the parameters specified in the protobufs discussed above set to their specified default values, including enabling two ports to transfer RAW UDP payload data. In response to being powered on, the radio may load a current configuration file (previously deployed to the radio) at operation 810.

Upon loading the configuration file at operation 810, process 800 proceeds to operation 815. At operation 815, the radio listens to the designated configuration port for UDP packets including a configuration file. In some embodiments, a valid configuration file may be periodically sent to the configuration port of the radio. When a configuration packet including a (new) configuration file is received at the designated configuration port, the active or current configuration file can be replaced with the new configuration file at operation 820. Continuing to operation 825, communication on all data channels is stopped and the radio powered off. At operation 830, the radio and its data channels are restarted. In some embodiments, the bridge application may be configured to execute as a system service and can be started automatically when the radio is turned on. Proceeding to operation 835, the configuration file is sent back to the host (e.g., node 515 for radio 525 in truck 505 in FIG. 5), as specified in the protobufs discussed above. Sending the configuration file back to the host may facilitate the host confirming that the proper configuration file was deployed to the radio. Process 800 continues to operation 840 where the radio operates in accordance with the new configuration file. While the radio is operating with the new configuration file, it may continue to listen to its designated configuration port for an update or replacement configuration file, as indicated at operation 815. In this manner, the configuration of the radio can be replaced at runtime from the host, in some embodiments.

In some embodiments of an example vehicle-to-vehicle radio system and method herein, data packets (e.g., the payload of the packet) sent and received by the system might be encrypted and decrypted using keys obtained by the nodes of the network prior to an exchange of data over the network. That is, the requisite encryption keys (e.g., public-private keys) used for encrypting data in a vehicle-to-vehicle communication network herein can be obtained by the network nodes before the autonomous, self-driving truck and any convoy vehicles that will talk to the truck begin a communication session (e.g., before a truck and the convoy vehicles commence one or more trips during which they will engage in wireless communication with each other). For example, the encryption keys might be obtained by the nodes from a cloud server or service.

In some aspects, the particular encryption scheme or technique that might be used in wireless vehicle-to-vehicle communications in a system herein might include one or more types of encryption techniques that are now known or that become known in the future. In some instances, the encryption technique(s) used can be in addition to (or in lieu of) an encryption technique prescribed by, for example, the RF communication protocol or standard underlying a system and method herein. In this manner, the security of the wireless communications between vehicles in some embodiments disclosed here might not be dependent on the native or inherent security of the RF communication protocol.

In some embodiments, the type of encryption used in a system herein may be specified on a per channel basis, where the type of encryption used for each logical data channel can be specified in the configuration file. In this manner, the overall costs (e.g., in terms of compute resources, bandwidth, time, etc.) associated with encrypting data in a system herein might be optimized to a minimum by selectively and intelligently specifying the encryption types on a per channel basis. For example, depending on the intended use of a first data channel, the type of encryption specified in a configuration file for that first data channel might be relatively costly (e.g., bandwidth consumption) as compared to a second data channel where the security used is relatively inexpensive (e.g., a digital signature of the received data packets).

In one example use-case including some embodiments of a wireless vehicle-to-vehicle communications system and method herein, an autonomous truck might broadcast the state of its operation in a very low latency manner to convoy vehicles within wireless communication range of the truck. Referring to FIG. 5, a data stream including a video from the truck may be routed from node 515 to radio 520, wirelessly broadcast to radio 530 and routed via a UDP link to the node 525 in a lead vehicle 510, wherein the radios and nodes are configured with the disclosed configuration file in accordance with the disclosure hereinabove. The data stream received at the lead vehicle's node 525 may be processed to, for example, present the truck details to the operator-driver of the lead vehicle to remotely control one or more aspects of the truck. For example, a selection of a GUI in the lead vehicle might cause a command to be sent from node 525 to node 515 via radios 530 and 520. Upon receipt of the command, encapsulated in a data packet configured as disclosed hereinabove, node 515 may respond to the command as if it were generated locally at the truck.

Figure 9:
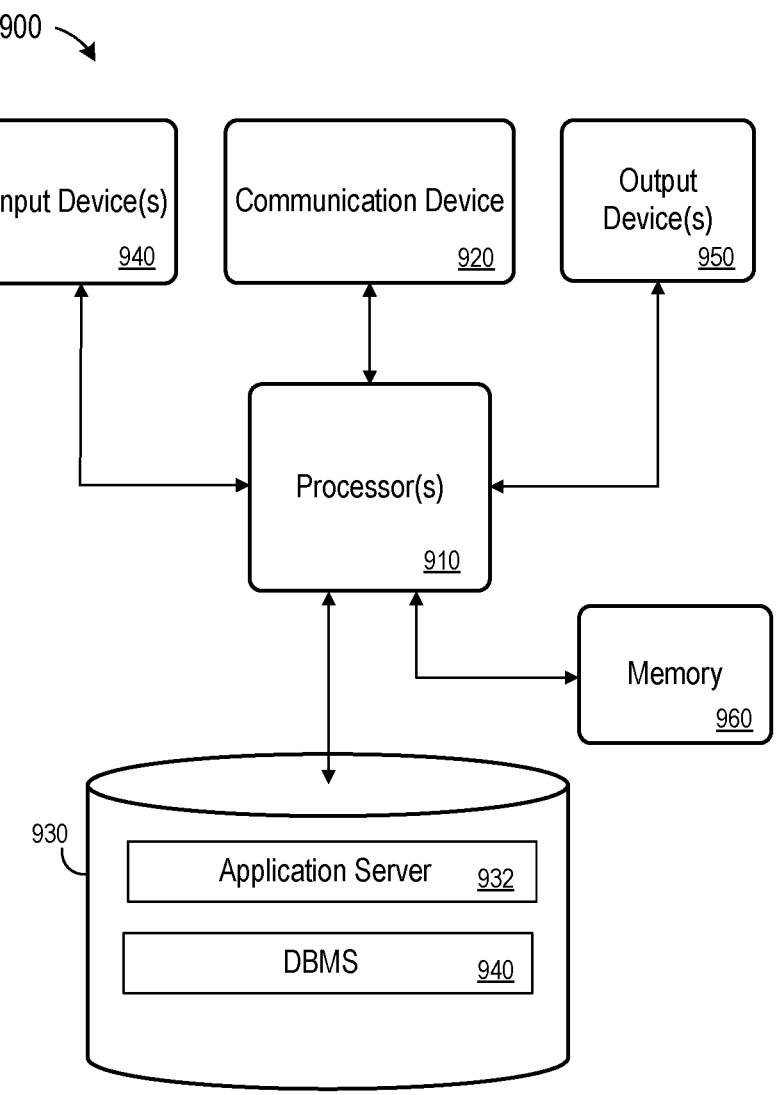
FIG. 9 an illustrative block diagram of a computing system, in accordance with an example embodiment.

FIG. 9 illustrates a computing system 900 that may be used in any of the architectures or networks (e.g., FIG. 5) and processes (e.g., FIG. 8) disclosed herein, in accordance with an example embodiment. FIG. 9 is a block diagram of server node 900 embodying a scenario characterization engine, according to some embodiments. Server node 900 may comprise a general-purpose computing apparatus and may execute program code to perform any of the functions described herein. Server node 900 may comprise an implementation of at least some features of the radios and nodes of some embodiments herein. Server node 900 may include other unshown elements according to some embodiments.

Server node 900 includes processing unit(s) 910 operatively coupled to communication device 920, data storage device 930, one or more input devices 940, one or more output devices 950, and memory 960. Communication device 920 may facilitate communication with external devices, such as an external network, a data storage device, or other data source. Input device(s) 940 may comprise, for example, a keyboard, a keypad, a mouse or other pointing device, a microphone, knob or a switch, an infra-red (IR) port, a docking station, and/or a touch screen. Input device (s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

Application server 932 may each comprise program code executed by processor(s) 910 to cause server 900 to perform any one or more of the processes described herein. Embodiments are not limited to execution of these processes by a single computing device. Data storage device 930 may also store data and other program code for providing additional functionality and/or which are necessary for operation of server 900, such as device drivers, operating system files, etc. DBMS 940 may store and manage a variety of data types and structures, including, for example, configuration files herein.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
a memory configured to store a configuration file defining one or more data structures to configure a first radio to communicate with a second radio, the configuration file defining at least a radio frequency (RF) channel, a plurality of data ports, and a data port dedicated to receiving an instance of the configuration file; and
a processor configured to update a set of configuration settings of the first radio based on the data structures defined in the configuration file, and to communicate RF data through the plurality of data ports with the second radio.

2. The system of claim 1, wherein the updating of the set of configuration settings of the first radio comprises:
receiving data packets on the port dedicated to receiving an instance of the configuration file, the received data packets communicating an updated configuration file;
replacing the configuration file stored in the memory with the updated configuration file;
powering down and restarting the first radio; and
updating the set of configuration settings of the first radio based on the data structures defined in the updated configuration file.

3. The system of claim 1, wherein the processor is configured to automatically update the set of configuration settings of the first radio upon a powering up of the first radio.

4. The system of claim 1, wherein the plurality of data ports defined by the configuration file includes at least a data port dedicated to receiving an instance of the configuration file, a data port dedicated to outgoing data, and a data port dedicated to incoming data.

5. The system of claim 1, wherein the plurality of data ports defined by the configuration file further includes a data port dedicated to sending quality of service statics regarding the first radio.

6. The system of claim 1, wherein the configuration file further defines a data structure to represent a software version for a host computer that interfaces with the first radio, wherein host computers having compatible software versions can communicate with each other.

7. A method comprising:
storing a configuration file defining one or more data structures to configure a first radio to communicate with a second radio, the configuration file defining at least a radio frequency (RF) channel, a plurality of data ports, and a data port dedicated to receiving an instance of the configuration file; and updating a set of configuration settings of the first radio based on the data structures defined in the configuration file, and to communicate RF data through the plurality of data ports with the second radio.

8. The method of claim 7, wherein the updating of the set of configuration settings of the first radio comprises:
receiving data packets on the port dedicated to receiving an instance of the configuration file, the received data packets communicating an updated configuration file;
replacing the stored configuration file with the updated configuration file;
powering down and restarting the first radio; and
updating the set of configuration settings of the first radio based on the data structures defined in the updated configuration file.

9. The method of claim 7, further comprising automatically updating the set of configuration settings of the first radio upon a powering up of the first radio.

10. The method of claim 7, wherein the plurality of data ports defined by the configuration file includes at least a data port dedicated to receiving an instance of the configuration file, a data port dedicated to outgoing data, and a data port dedicated to incoming data.

11. The method of claim 7, wherein the plurality of data ports defined by the configuration file further includes a data port dedicated to sending quality of service statics regarding the first radio.

12. The method of claim 7, wherein the configuration file further defines a data structure to represent a software version for a host computer that interfaces with the first radio, wherein host computers having compatible software versions can communicate with each other.

13. A vehicle comprising:
a memory configured to store a configuration file defining one or more data structures to configure a first radio to communicate with a second radio, the configuration file defining at least a radio frequency (RF) channel, a plurality of data ports, and a data port dedicated to receiving an instance of the configuration file; and
a processor configured to update a set of configuration settings of the first radio based on the data structures defined in the configuration file, and to communicate RF data through the plurality of data ports with the second radio.

14. The vehicle of claim 13, wherein the updating of the set of configuration settings of the first radio comprises:
receiving data packets on the port dedicated to receiving an instance of the configuration file, the received data packets communicating an updated configuration file;
replacing the configuration file stored in the memory with the updated configuration file;
powering down and restarting the first radio; and
updating the set of configuration settings of the first radio based on the data structures defined in the updated configuration file.

15. The vehicle of claim 13, wherein the processor is configured to automatically update the set of configuration settings of the first radio upon a powering up of the first radio.

16. The vehicle of claim 13, wherein the plurality of data ports defined by the configuration file includes at least a data port dedicated to receiving an instance of the configuration file, a data port dedicated to outgoing data, and a data port dedicated to incoming data.

17. The vehicle of claim 13, wherein the configuration file further defines a data structure to represent a software version for a host computer that interfaces with the radio, wherein host computers having compatible software versions can communicate with each other.

* * * * *